United States Patent
Ewert

(10) Patent No.: US 12,541,951 B2
(45) Date of Patent: Feb. 3, 2026

(54) TRAINING NEURAL NETWORKS USING A NEURAL NETWORK

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 17/757,834

(22) PCT Filed: Dec. 15, 2020

(86) PCT No.: PCT/EP2020/086249
§ 371 (c)(1),
(2) Date: Jun. 22, 2022

(87) PCT Pub. No.: WO2021/130066
PCT Pub. Date: Jul. 1, 2021

(65) Prior Publication Data
US 2023/0044889 A1    Feb. 9, 2023

(30) Foreign Application Priority Data
Dec. 23, 2019 (DE) ............... 10 2019 220 549.6

(51) Int. Cl.
*G06V 10/774* (2022.01)
*G06N 3/088* (2023.01)
*G08G 1/01* (2006.01)

(52) U.S. Cl.
CPC ......... *G06V 10/774* (2022.01); *G06N 3/088* (2013.01)

(58) Field of Classification Search
CPC ...... G06V 10/774; G06N 3/088; G06N 3/045; G08G 1/0129; G08G 1/0133; G08G 1/166
See application file for complete search history.

(56) References Cited

U.S. PATENT DOCUMENTS

| 9,760,806 B1* | 9/2017 | Ning ............... G06V 20/56 |
| 2010/0063736 A1* | 3/2010 | Hoetzer ........... B60W 30/09 |
| | | 701/301 |

(Continued)

FOREIGN PATENT DOCUMENTS

| CN | 107944375 A | 4/2018 |
| DE | 10 2004 030 782 A1 | 1/2006 |

(Continued)

OTHER PUBLICATIONS

International Search Report corresponding to International Patent Application No. PCT/EP2020/086249; mailed Mar. 30, 2021 (7 pages).

*Primary Examiner* — Amandeep Saini
*Assistant Examiner* — Andrew S Budisalich
(74) *Attorney, Agent, or Firm* — Maginot, Moore & Beck LLP

(57) ABSTRACT

The disclosure relates to a method for training a first neural network, in particular for generating training data for at least one second neural network, using a controller, wherein measurement data ascertained by at least one surroundings sensor or artificially generated data of initially ten traffic scenarios is received, the received measurement data is fed to the first neural network as input data in order to train the first neural network, and the first neural network which is trained on the basis of the input data is used to generate data of traffic scenarios which differ from the initial traffic scenarios. Furthermore, the disclosure relates to a method for training at least one second neural network, to a controller, to a computer program, and to a machine-readable storage medium.

7 Claims, 2 Drawing Sheets

(56) References Cited

U.S. PATENT DOCUMENTS

| | | |
|---|---|---|
| 2018/0349526 A1 | 12/2018 | Atsmon et al. |
| 2018/0365888 A1* | 12/2018 | Satzoda ............... G05D 1/0251 |
| 2019/0147331 A1* | 5/2019 | Arditi .................... G06N 3/045 |
| | | 706/20 |
| 2020/0377007 A1* | 12/2020 | Fujiyama ............... H05B 45/20 |
| 2021/0150309 A1* | 5/2021 | Dancel ................. G06V 10/772 |
| 2021/0255304 A1* | 8/2021 | Fontijne ................ G06V 20/10 |

FOREIGN PATENT DOCUMENTS

| | | |
|---|---|---|
| DE | 10 2018 207 566 A1 | 11/2019 |
| WO | 2018/002910 A1 | 1/2018 |
| WO | 2019/127231 A1 | 7/2019 |

\* cited by examiner

TRAINING NEURAL NETWORKS USING A NEURAL NETWORK

This application is a 35 U.S.C. § 371 National Stage Application of PCT/EP2020/086249, filed on Dec. 15, 2020, which claims the benefit of priority to Serial No. DE 10 2019 220 549.6, filed on Dec. 23, 2019 in Germany, the disclosures of which are incorporated herein by reference in their entirety.

The disclosure relates to a method for training a first neural network, in particular for generating training data for at least one second neural network, to a method for training at least one second neural network, to a control device, to a computer program and to a machine-readable storage medium.

BACKGROUND

Vehicles with automated driving functions can be operated autonomously from a particular automation level and without a driver. The vehicle can, for example, automatically follow a course of the road, independently identify other road users or obstacles, and calculate the appropriate control commands in the vehicle and pass these to actuators in the vehicle, as a result of which the route of the vehicle is influenced. In the case of a fully autonomous vehicle, the driver is not involved in the driving situation.

Currently used vehicles which can be operated in automated fashion have a plurality of environment sensors. The environment sensors are used, for example, for identifying the environment of the vehicle. The sensor data from the environment sensors can be evaluated based on algorithms and, for example, objects in the environment of the vehicle can be identified. The sensor data influence trajectory planning of the vehicle and thus also subsequent actuation of the vehicle actuators, as a result of which the autonomous driving function is implemented.

Neural networks or artificial intelligence are used to identify objects from the measurement data from the environment sensors and for trajectory planning. These neural networks are essentially trained by measurement data from environment sensors of as many applications or traffic scenarios as possible in order to be able to currently identify objects with a high degree of probability and in order to navigate the vehicle safely through the environment based thereon. The limited number of traffic scenarios used to train neural networks can adversely affect the performance of the neural networks.

SUMMARY

The object on which the disclosure is based can be considered that of proposing a method for improving the performance of neural networks.

This object is achieved by means of the respective subject matter of the disclosure. Advantageous configurations of the disclosure are the subject matter of the embodiments.

One aspect of the disclosure provides a method for training a first neural network. The first neural network is preferably used to generate training data for at least one second neural network. The method can be carried out by a control device.

In one step, measurement data ascertained by at least one environment sensor or artificially generated data of initial traffic scenarios are received. The data or measurement data can be retrieved from a database or received directly from vehicles via a communication link.

In another step, the received measurement data is fed to the first neural network as input data in order to train the first neural network.

The first neural network which is trained on the basis of the input data is subsequently used to generate data of traffic scenarios which differ from the initial traffic scenarios. It is thus possible to generate a plurality of new traffic scenarios which go beyond the initial traffic scenarios or differ therefrom.

The first neural network may be configured as an artificial intelligence. The first neural network is preferably used to generate ideal traffic scenarios which are used as training data for further neural networks. An ideal traffic scenario may preferably be a traffic scenario without accidents.

The first neural network preferably has a classifier, by way of which the first neural network is able to identify other road users and objects in the environment sensor data and to link these with an instantaneous, highly accurate vehicle position of the at least one vehicle which provides the measurement data. The highly accurate position of the vehicle can be ascertained in a manner based on GNSS or in a manner based on Car-to-X or in a manner based on FeatureMap.

The aim of the training process of the first neural network is to provide a neural network or artificial intelligence which artificially generates an ideal road traffic or traffic situation. An ideal road image and an ideal road traffic which does not have any accidents are thus provided for the training step, in the form of input data, to the first neural network based on the measurement data of traffic scenarios.

After the first neural network has been trained, as many artificial traffic scenarios as possible are generated in a subsequent step using the newly trained first neural network. As a result, the trained first neural network is also able to artificially generate the ideal traffic scenario trained in the first step for an environment which is thus not present in the world. In this way, the first neural network is able to generate as many driving scenarios and traffic scenarios as possible, which may arise in daily operation of the vehicle, without these having been explicitly present in the original training data. In this case, the different local traffic rules are preferably complied with and also the location of structures and road courses are taken into account. In addition, what is known as a 3D feature map can be included in the data generation for particular vehicle positions.

The method can be used to train the first neural network by means of training data and/or measurement data from environment sensors for as many applications as possible in order to be able to correctly identify objects with a high degree of probability and in order to navigate the vehicle safely through the environment based thereon. In particular, the generation of a plurality of possible traffic scenarios as the basis of training methods for neural networks can be used to increase the performance of neural networks.

Another aspect of the disclosure provides a control device, wherein the control device is configured to carry out the method. The control device can be designed, for example, as a cloud technology, as a high-performance computer (HPC) or what is known as hardware in the loop (HIL).

Furthermore, one aspect of the disclosure provides a computer program which comprises instructions which, when the computer program is carried out by a computer or a control device, cause said computer or control device to carry out the method according to the disclosure. Another aspect of the disclosure provides a machine-readable storage medium on which the computer program according to the disclosure is stored.

The measurement data collected from real traffic scenarios by environment sensors can preferably be provided by different vehicles. The corresponding vehicles may be able to be operated in an assisted, a partly automated, a highly automated and/or fully automated or driverless manner in accordance with the BASt (German Federal Highway Research Institute) standard. Furthermore, the neural networks to be trained by the first neural network can be used in such vehicles.

The vehicles may be designed as passenger cars, robots, drones, watercraft, rail vehicles, robotaxis, industrial robots, commercial vehicles, buses, aircraft, helicopters and the like.

The method according to the disclosure produces the following advantages:

Artificial environment sensor data or training data can be generated by the trained first neural network, said data being used as the basis for the training of new algorithms or neural networks in environment sensors or vehicle control devices. The first neural network can create artificial road courses based on real road courses and traffic situations and based on physical properties of road users.

A plurality of possible applications can be taken into account by training the first neural network or the training network on a high-performance computer and by training the neural networks based on such a training network. In this case, applications which rarely occur in reality can also be taken into account.

The measurement data ascertained by the environment sensors are considered in their entirety. To this end, the measurement data are transformed into a standardized world coordinate system and generated in a target coordinate system of the respective environment sensor at the intended planned installation position or mounting position of the environment sensor in the vehicle, as a result of which the second neural network to be trained is able to be adapted in optimum fashion for specific installation positions of the environment sensors on a vehicle.

Furthermore, safety during automated operational vehicles can be improved by the extensive training of the second neural network using the artificial output data of the first neural network. The second neural network can thus identify objects and/or traffic situations more efficiently. A subsequent or included trajectory planning in the second neural network can be carried out using the method with a higher degree of accuracy.

Driving lessons passed by test drives for learning as many traffic scenarios as possible can be reduced to a minimum in a targeted manner by way of the method.

According to one exemplary embodiment, measurement data, ascertained by at least one environment sensor of different vehicles, of ideal traffic scenarios are received and used to train the first neural network. As a result, the first neural network is trained using real environment sensor data of many vehicles able to be operated in automated fashion as possible.

According to another embodiment, the received measurement data or artificially generated data of initial traffic scenarios is fed to the first neural network in a manner depending on at least one sensor type of the environment sensor, depending on at least one mounting position of the environment sensor on a vehicle and/or depending on a position of at least one vehicle in order to train the first neural network. As a result, different road scenarios, various environment sensors and installation locations of the environment sensors in the vehicle can also be taken into account in the training of the first neural network.

The environment sensors may be, for example, radar sensors, Lidar sensors, camera sensors, ultrasonic sensors, position sensors and the like.

Furthermore, the sensor orientation within the vehicle can also be taken into account by the method. As a result, the corresponding measurement data of environment sensors and the objects identified based on the measurement data can be transformed into a standardized world coordinate system and the first neural network can be trained for ideal traffic scenarios based thereon.

Another aspect of the disclosure provides a method for training at least one second neural network. Such a method can preferably be carried out by a control device.

Data of a plurality of traffic scenarios are generated by a first neural network. The generated data are subsequently fed to the second neural network as input data in order to train the second or network.

As a result, an artificial intelligence or the first neural network can be used for training at least one further artificial intelligence or the at least one second neural network for at least object identification, at least one autonomous driving function, at least one environment sensor or at least one vehicle control device of a vehicle able to be operated in automated fashion.

The first neural network used for training purposes can be used to create a plurality of artificial driving scenarios for training the at least one second neural network. This has the advantage that completing millions of kilometers using test vehicles able to be operated in automated fashion is prevented in order to set the neural networks used to critical driving situations as well.

The method is also used to train the neural networks of the environment sensors and control units of the vehicle using traffic scenarios that occur only rarely or not at all in practice.

In one exemplary embodiment, the output data created by the first neural network are configured to train an object classifier of at least one environment sensor, the object classifier being based on the second neural network, depending on a sensor type and a mounting position of the environment sensor.

In particular, the output data are created by the first neural network in such a way that they are suitable for training an object classifier of at least one environment sensor, the object classifier being based on the second neural network, depending on a sensor type and a mounting position of the environment sensor.

The newly provided artificial intelligence or the first neural network can generate, for example, the training data for an environment sensor of a vehicle able to be operated in automated fashion and the object classifier thereof based on the mounting position of the environment sensor in the later vehicle. To this end, the generated input data of traffic scenarios can be transformed into an environment sensor coordinate system. In this case, the direction with respect to vehicle coordinates or world coordinates in which the environment sensor is installed and oriented is taken into account.

Furthermore, the visibility and perceptibility of different sensor types can be taken into account when implementing the method. For example, a Lidar sensor can be used over a radar sensor for detecting different objects and object properties. Furthermore, a sampling range which constitutes at least some traffic scenarios can be incorporated into the training of the second neural network depending on the sensor type.

The method is used to generate, for example, artificially generated measurement data of the environment sensors for training an object classifier of an environment sensor based on the transformation of the measurement data of the environment sensor into a world coordinate system. As a result, only the objects visible to the respective environment sensor are artificially generated and the downstream second neural network to be trained is trained for the object identification of this environment sensor for exactly the installation position of the environment sensor in the later autonomous vehicle. This procedure can reduce the amount of input data required and enable an effective and targeted training process of the second neural network. By virtue of as much artificial data as possible being generated by the first neural network, the environment sensor mentioned by way of example can be trained for as many situations and traffic scenarios which occur only rarely or not at all in road traffic as possible. The classifier of the environment sensor for object identification is thus also trained for as many special cases as possible in road traffic.

According to another embodiment, the second neural network is trained by input data generated by the first neural network and by measurement data ascertained by environment sensors. This measure can be used to train the second neural network of an environment sensor or a vehicle control device using the artificially generated input data of the first neural network with a combination of real environment sensor data. In this way, it is possible to ensure that the newly trained second neural network is trained not only based on artificial training data but also based on a mixture of artificially generated training data with measured training data.

According to another exemplary embodiment, the measurement data ascertained by environment sensors are used to check reactions of the second neural network to traffic situations. As a result, a test of the second neural network can be carried out using real environment sensor data.

BRIEF DESCRIPTION OF THE DRAWINGS

The following text explains preferred exemplary embodiments of the disclosure in more detail based on highly simplified schematic illustrations, in which.

DETAILED DESCRIPTION

Figure 1:
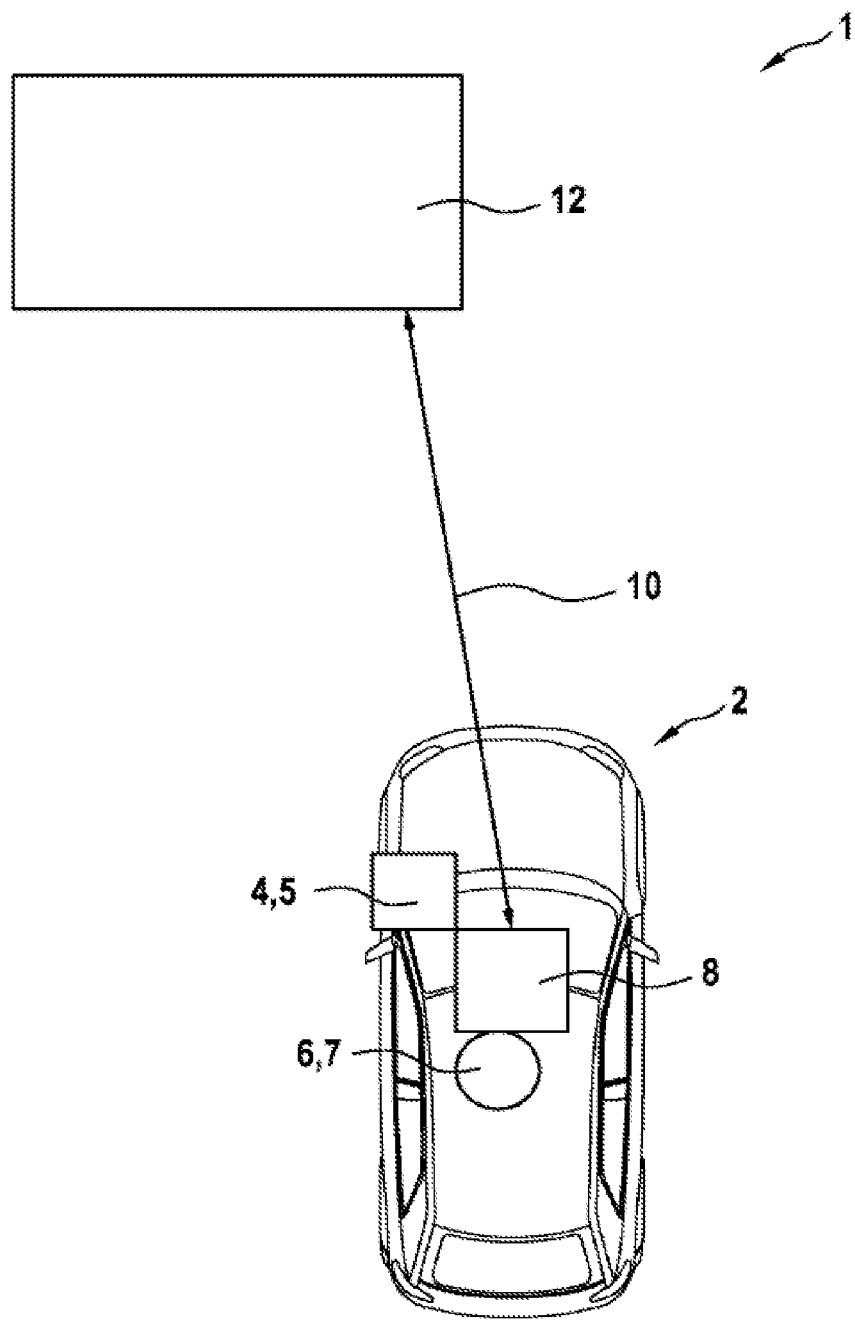
FIG. 1 shows a schematic illustration of a traffic scenario with a vehicle and FIG. 2 shows a schematic flow chart for illustrating a method according to one embodiment.

FIG. 1 shows a schematic illustration of a traffic scenario 1 with a vehicle 2. For the sake of clarity, the traffic scenario 1 has one vehicle 2 but may preferably have a plurality of vehicles 2 which ascertain measurement data and can use same to train neural networks.

The measurement data of the traffic situation 1 can preferably be ascertained by environment sensors 4, 6. The ascertained measurement data can be preprocessed or at least intermediately stored by vehicle-based control units 8. In a subsequent step, the measurement data of the traffic situation 1 ascertained by the environment sensors 4, 6 can be transmitted to a control device 12 via a communication link 10.

The environment sensors 4, 6 may be configured, for example, as radar sensors, Lidar sensors, camera sensors, ultrasonic sensors, position sensors and the like.

In the exemplary embodiment illustrated, the vehicle 2 has a camera sensor 4 and a Lidar sensor 6. The vehicle 2 thus has two different sensor types which are secured to the vehicle 2 in different mounting positions 5, 7. By way of example, the camera sensor 4 can be secured in the region of a windshield 5 of the vehicle 2 and the Lidar sensor 6 can be secured to the roof 7 of the vehicle 2.

The measurement data ascertained by the environment sensors 4, 6 are transmitted to the central control device 12 by the vehicle-based control unit 8 and are used there as input data to train neural networks. To this end, the control device 12 can be configured, for example, as a high-performance computer.

The vehicle 2 can preferably be configured as a vehicle able to be operated in automated fashion according to the BASt standard.

Figure 2:
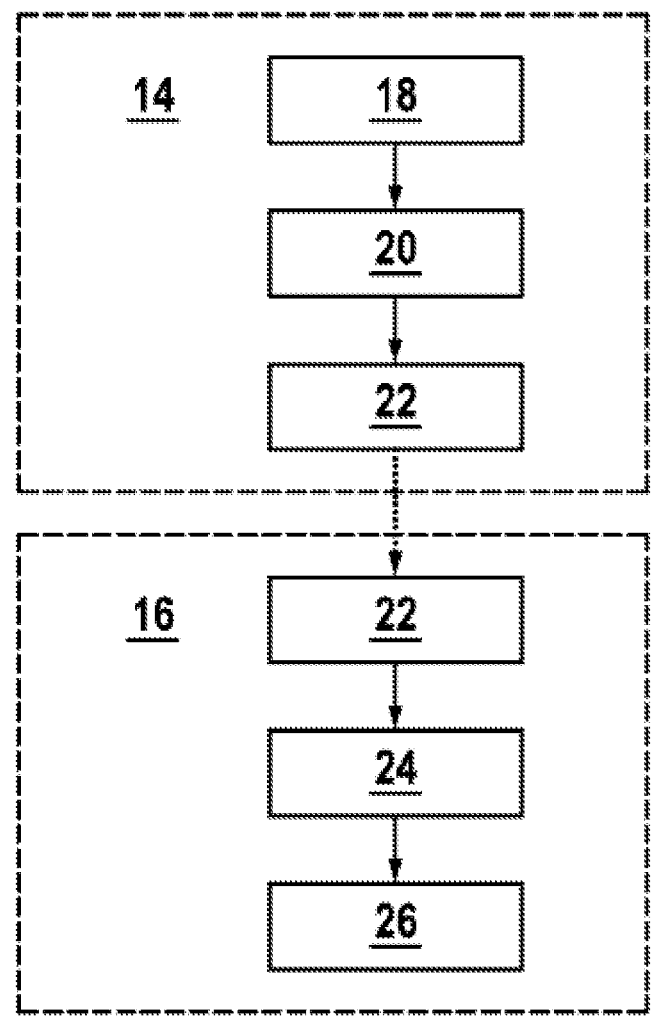

FIG. 2 shows a schematic flow chart for illustrating a first method 14 and a second method 16 according to one embodiment.

A first method 14 consists in training a first neural network. A second method 16 serves for using the first neural network to train other neural networks. The methods 14, 16 are carried out substantially by the control device 12.

In one step 18 of the first method 14, measurement data ascertained by at least one environment sensor 4, 6 or artificially generated data of initial traffic scenarios 1 are received. The traffic scenarios 1 are preferably ideal traffic scenarios 1 or traffic scenarios without accidents.

The measurement data received are subsequently fed the first neural network as input data in order to train the first neural network 20.

The first neural network which is trained based on the input data is then used to generate 22 data from traffic scenarios 1' which differ from the initial traffic scenarios 1.

In the second method 16, the data 22 of traffic scenarios 1' which differ from the initial traffic scenarios 1, said data being generated by the first neural network, are fed to the second neural network as input data in order to train the second neural network 24.

In another step 26, the trained second neural network is implemented, for example, in a vehicle-based control unit 8 or an environment sensor 4, 6 of the vehicle 1. The second neural network is then used in at least one object identification, at least one autonomous driving function, at least one environment sensor or for at least one vehicle control device of a vehicle able to be operated in automated fashion.

The invention claimed is:

1. A method for training a second neural network for a second environment sensor of a second vehicle, the method comprising:
receiving first measurement data of first traffic scenarios that are ascertained by at least one first environment sensor of a first vehicle, the at least one first environment sensor having at least one first mounting position and being of at least one first sensor type;
transforming the first measurement data of the first traffic scenarios into a standardized world coordinate system;
training the first neural network by feeding the transformed first measurement data of the first traffic scenarios to the first neural network as input data, in a manner depending on (i) a position of the first vehicle, (ii) the at least one first sensor type of the at least one first environment sensor, and (iii) the at least one first mounting position of the at least one first environment sensor;

receiving second measurement data of second traffic scenarios which differ from the first traffic scenarios;

transforming, using the first neural network, the second measurement data of the second traffic scenarios into an environment sensor coordinate system of the second environment sensor depending on both (i) a second mounting position of the second environment sensor and (ii) a second sensor type of the second environment sensor; and training the at least one second neural network by feeding the transformed second measurement data of the second traffic scenarios to the second neural network as input data.

2. The method as claimed in claim 1: wherein the first measurement data of the first traffic scenarios include traffic scenarios without traffic accidents.

3. The method as claimed in claim 1, wherein the second neural network is configured to operate as an object classifier.

4. The method as claimed in claim 1, the training the second neural network further comprising:

training the second neural network using the transformed second measurement data of the second traffic scenarios generated by the first neural network and using further measurement data ascertained by further environment sensors.

5. The method as claimed in claim 4, the training the at least one second neural network further comprising:

using the further measurement data ascertained by the further environment sensors to check reactions of the second neural network to traffic situations.

6. The method as claimed in claim 1, wherein the method is carried out by a computer program having instructions that, when carried out by one of a computer and a control device, cause the one of the computer and the control device to carry out the method.

7. A non-transitory machine-readable storage medium that stores a computer program for training a second neural network, the computer program having instructions that, when carried out by one of a computer and a control device, cause the one of the computer and the control device to:

receive first measurement data of first traffic scenarios that are ascertained by at least one first environment sensor of a first vehicle, the at least one first environment sensor having at least one first mounting position and being of at least one first sensor type;

transform the first measurement data of the first traffic scenarios into a standardized world coordinate system;

train the first neural network by feeding the transformed first measurement data of the first traffic scenarios to the first neural network as input data, in a manner depending on (i) a position of the first vehicle, (ii) the at least one first sensor type of the at least one first environment sensor, and (iii) the at least one first mounting position of the at least one first environment sensor;

receive second measurement data of second traffic scenarios which differ from the first traffic scenarios;

transform, using the first neural network, the second measurement data of the second traffic scenarios into an environment sensor coordinate system of the second environment sensor depending on both (i) a second mounting position of the second environment sensor and (ii) a sensor type of the second environment sensor; and train the second neural network by feeding the transformed second measurement data of the second traffic scenarios to the second neural network as input data.

\* \* \* \* \*